US008332373B1

(12) United States Patent
Milby (10) Patent No.: US 8,332,373 B1
(45) Date of Patent: Dec. 11, 2012

(54) REPRESENTING USER-DEFINED ROUTINES WITH DEFINED DATA STRUCTURES

(75) Inventor: Gregory H. Milby, San Marcos, CA (US)

(73) Assignee: Teradata US, Inc., Dayton, OH (US)

( * ) Notice: Subject to any disclaimer, the term of this patent is extended or adjusted under 35 U.S.C. 154(b) by 2850 days.

(21) Appl. No.: 10/324,267

(22) Filed: Dec. 18, 2002

(51) Int. Cl.
*G06F 7/00* (2006.01)
*G06F 17/00* (2006.01)

(52) U.S. Cl. .................... 707/702; 707/713; 707/791
(58) Field of Classification Search .................. 707/2–4, 707/200–201, 1, 10, 100–104.1, 8, 702, 713, 707/791, 718, E17.017, E17.131, 999.002
See application file for complete search history.

(56) References Cited

U.S. PATENT DOCUMENTS

| | | | | |
|---|---|---|---|---|
| 4,667,290 A * | 5/1987 | Goss et al. | ...... | 717/147 |
| 4,905,138 A * | 2/1990 | Bourne | ...... | 717/139 |
| 5,303,383 A | 4/1994 | Neches et al. | | |
| 5,640,584 A | 6/1997 | Kandasamy et al. | | |
| 5,689,698 A * | 11/1997 | Jones et al. | ...... | 707/4 |
| 5,794,250 A * | 8/1998 | Carino et al. | ...... | 707/9 |
| 5,799,310 A * | 8/1998 | Anderson et al. | ...... | 707/102 |
| 5,864,842 A | 1/1999 | Pederson et al. | | |
| 5,872,904 A | 2/1999 | McMillen et al. | | |
| 5,873,083 A * | 2/1999 | Jones et al. | ...... | 707/4 |
| 5,884,299 A * | 3/1999 | Ramesh et al. | ...... | 707/2 |
| 5,895,467 A * | 4/1999 | Ubell et al. | ...... | 707/9 |
| 5,930,786 A * | 7/1999 | Carino et al. | ...... | 707/4 |
| 6,012,067 A * | 1/2000 | Sarkar | ...... | 707/103 R |
| 6,108,648 A * | 8/2000 | Lakshmi et al. | ...... | 707/999.002 |
| 6,192,358 B1 * | 2/2001 | Fuh et al. | ...... | 707/4 |
| 6,208,993 B1 * | 3/2001 | Shadmon | ...... | 707/102 |
| 6,374,236 B1 * | 4/2002 | Chen et al. | ...... | 707/2 |
| 6,421,656 B1 * | 7/2002 | Cheng et al. | ...... | 707/2 |
| 6,728,694 B1 * | 4/2004 | Ramasamy et al. | ... | 707/999.002 |
| 6,801,903 B2 * | 10/2004 | Brown et al. | ...... | 707/999.002 |
| 6,920,446 B1 * | 7/2005 | Wang et al. | ...... | 707/2 |
| 6,938,044 B1 * | 8/2005 | Milby | ...... | 707/100 |
| 6,959,305 B2 * | 10/2005 | Bird et al. | ...... | 707/104.1 |
| 6,980,976 B2 * | 12/2005 | Alpha et al. | ...... | 707/999.001 |
| 2002/0123991 A1 * | 9/2002 | Asami et al. | ...... | 707/3 |
| 2002/0198891 A1 * | 12/2002 | Li et al. | ...... | 707/102 |
| 2003/0093408 A1 * | 5/2003 | Brown et al. | ...... | 707/2 |
| 2003/0120636 A1 * | 6/2003 | Bird et al. | ...... | 707/2 |
| 2003/0187850 A1 * | 10/2003 | Reed et al. | ...... | 707/10 |
| 2004/0267766 A1 * | 12/2004 | Marek et al. | ...... | 707/100 |

OTHER PUBLICATIONS

Eisenberg et al. "SQL: 1999, Formerly Known as SQL3"—vol. 28, No. 1, Mar. 1999 ACM press (pp. 131-138).*
Gulutzan et al. "SQL-99 Complete, Really—An Example-Based Reference Maunal of the New Standard" From R&D Books—1999 (pp. 30-33, 517-539).*
Paul Brown—"Implementing the Spirit of SQL-99" 1999 ACM SIGMOD (pp. 515-518).*

(Continued)

*Primary Examiner* — Anh Ly
(74) *Attorney, Agent, or Firm* — Trop, Pruner & Hu P.C.

(57) ABSTRACT

A database system constructs representation for predicate expressions invoking user-defined routines. A first representation is constructed if an indicator has a first value, and a second representation is constructed if the indicator has a second value. Based on which representation is used, an optimizer in the database system selects use of indexing and/or statistics and/or other performance-enhancement features in generating a query plan.

35 Claims, 5 Drawing Sheets

OTHER PUBLICATIONS

Natsev et al.—"Aggregate predicate Support in DBMS"—ACM International Conference proceeding Series, vol. 5 (pp. 111-120).*

Discoverer 4i Plus user's Guide, Release 4.1 A86731-01 of ORACLE, copyright 2000 Oracle Cor[poration (pp. 1-18) (http://octrials.nci.nih.gov/discwb4/applet/help/userguide/output/6advanc.htm) (hereinafter ORACLE).*

Won Kim, Jorge Garza and Ali Keskin—"Spatial data management in database systems: Research directions"—Advances in Spatial Databases, Lecture Notes in Computer Science, 1993, vol. 692/1993—papes 1-13.*

Wei Lu and Jiawei Han—"Query evaluation and optimization in deductive and object-oriented spatial databases"—Information and Software Technology 1995, vol. 37, issue 3, (pp. 131-143).*

Peter Gulutzan & Trudy Pelzer, "SQL-99 Complete, Really," pp. 30-33, 517-539 (1999).

* cited by examiner

REPRESENTING USER-DEFINED ROUTINES WITH DEFINED DATA STRUCTURES

BACKGROUND

A database is a collection of logically related data. A popular type of database is provided by the relational database management system (RDBMS), which stores data in tables (or relations) that are arranged as rows and columns. A conventional RDBMS typically provides predefined data types, such as integers, real numbers, character strings, and so forth, for storing different types of data.

As database technology has progressed, more sophisticated data types have been made available. One such data type is the user-defined data type (UDT). A UDT differs from the predefined data types mentioned above in that the UDT is not defined by the standard database query language of the database system, but rather is defined by a user, an application, a database management system, or by another standard (other than the standard database query language). A database system can implement both predefined data types (e.g., the number data type for representing numeric values, character string data types for representing a sequence of characters, and so forth) and UDTs.

Typically, a UDT is associated with one or more user-defined methods (UDMs). A method is basically a software routine, associated with a UDT, that is created by a user (or that is provided with database software) for performing specified tasks. Often, for a given UDT, a user may define a suite of UDMs. In addition to UDMs, a user may also define user-defined functions (UDFs). Whereas a UDM is associated with a UDT, a UDF is a software routine that can be associated with UDTs or predefined data types.

Figure 1:
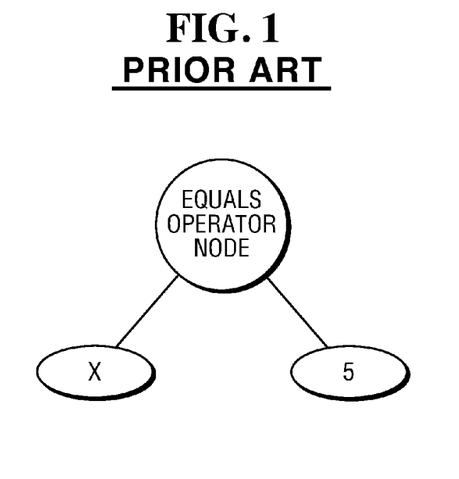
FIG. 1 illustrates a conventional operator-based parse tree.

Typically, a relational database system provides a user with the ability to apply a set of relational operators ($=, <, \leq, >, \geq$, etc.) against a set of data types (integers, real numbers, character strings, etc.). Such relational operators are usually applied in predicates of database queries. An example database query is provided below:

SELECT*
FROM T1
WHERE x=5;

The example query is a SELECT statement that is applied on table T1 with a predicate WHERE x=5. In conventional database systems, a predicate applied on predefined data types is represented as an operator-based parse tree. For example, the predicate expression, WHERE x=5, can be represented internally as an equals-operator parse tree, such as that shown in FIG. 1. The parse tree shown in FIG. 1 includes an equals-operator node, a left expression (that contains the field x), and a right expression containing the constant 5. By representing the predicate expression using the operator-based parse tree, the database software, which includes an optimizer, is able to categorize the predicate expression into one of several categories.

By categorizing different predicate expressions, an optimizer can efficiently determine if the use of performance-enhancing features (such as indexing and statistics) can improve the performance of a query plan. An optimizer is a module within the database software that is responsible for selecting a query plan (from among plural possible plans) for a given database query. In many cases, an optimizer uses a cost-based approach to selecting a query plan, in which the optimizer selects a plan that has the lowest cost (in terms of processing time and resource usage). As part of the query selection procedure, the optimizer checks to see if the use of performance-enhancing features, such as indexing and statistics, can help the performance of a query plan.

Because conventional relational database systems are a relatively mature technology, the classification of predicate expressions based on relational operators (such as $<, =, >$, etc.) is integrated into database software. Although conventional relational operators applied on predefined data types are typically represented by operator-based parse trees, such a representation is typically not available for user-defined "routines" (such as UDMs and UDFs). Therefore, for such user-defined routines, the optimizer is typically unable to apply performance-enhancement features such as indexing and statistics in the generation of a query plan. As a result, database system performance may suffer.

SUMMARY

In general, methods and apparatus are provided to enable the representation of user-defined routines (such as user-defined methods or user-defined functions) with defined data structures (e.g., operator-based parse trees) to enable the use of performance-enhancement features (such as indexing and statistics) in the generation of a query plan that contains predicate clauses invoking a user-defined routine.

Other or alternative features will become more apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 2:
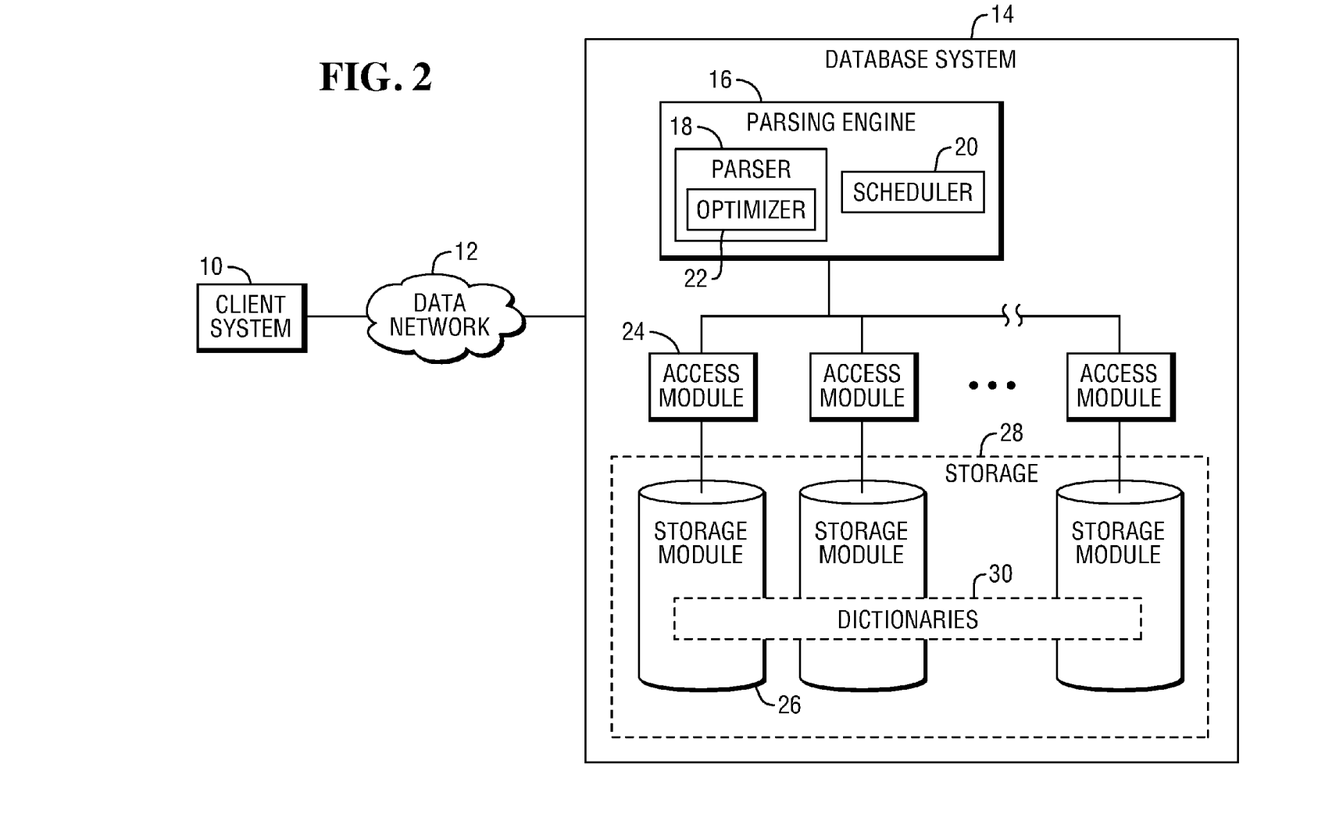
FIG. 2 is a block diagram of an example arrangement that includes a database system.

FIG. 2 illustrates an example arrangement in which a client system 10 is coupled to a database system 14 over a data network 12. Examples of the data network 12 include a local area network (LAN), a wide area network (WAN), the Internet, and so forth. The client system 10 is capable of issuing queries according to a standard database query language to the database system 14 to access or update data or to create or alter data structures (e.g., tables, rows, and so forth). One example of a standard database query language is the Structured Query Language (SQL), as promulgated by the American National Standards Institute (ANSI). One version of SQL that provides for UDTs is the SQL-99 or SQL:1999 Standard. Although reference is made to SQL-99 or SQL:1999 in this discussion, other embodiments can employ other types of standard database query languages that provide for user-defined routines, such as user-defined methods (UDMs) or user-defined functions (UDFs).

A UDM is associated with a user-defined data type (UDT), while a UDF can be used with either UDTs or predefined data types (e.g., integers, real numbers, character strings, and so forth). A common feature of both UDMs and UDFs is that they are software routines created by a user to perform specified tasks. A user-defined routine is typically not provided with database software. Rather, a user creates the methods or functions using data definition language (DDL) statements, such as the CREATE METHOD statement and the CREATE FUNCTION statement defined by SQL-99. Because such routines are defined by a user, they conventionally are not categorized to a particular operator type and represented as an operator-based parse tree. Without such categorization of predicate expressions by the database software into one of plural operator types, the optimizer is unable to readily determine whether performance-enhancement features such as indexing and statistics can be useful in a query plan that contains a predicate clause invoking a user-defined routine.

One performance-enhancing feature is the index, which is a structure that enhances the speed with which a database system is able to find matching row(s) of a table based on a given value or values of one or more columns (the index). Usually, the index is arranged in ascending or descending order, so that the database software can quickly search the index to find a particular value in a table. One or more columns of the table can be indexed, which means that a separate index table can be created to store the one or more columns (the index) along with pointers that indicate the rows in the table in which corresponding values of the index can be found.

The other performance enhancing feature includes statistics, which contain information on how data is structured in the various tables of a database. As an example, statistics include the number of rows in a given table, the approximation of the distributions of particular data values in columns of the table, and so forth. By accessing the statistics maintained on a database, the optimizer can make an intelligent decision on which query plan would be least costly given the characteristics of the data involved.

Although reference is made to indexing and statistics as examples of performance-enhancing features, other types of performance-enhancing features can be used in other embodiments.

In one embodiment, predicate expressions that can be associated with an operator-based parse tree may be assigned to one of the following operator types:

Explicit Term: TableColumn=Constant;
Range Term: Constant<TableColumn<Constant;
Bind Term: TableColumn1=TableColumn2–Join Term;
Cross Term: T1.TableColumn1+ T2.TableColumn2=T3.TableColumn3–Join Terms.

The four operator types to which a predicate expression can be assigned include Explicit Term, Range Term, Bind Term, and Cross Term. For the Explicit Term and Range Term types, indexing can be applied to the column (TableColumn) in the predicate expression. For the Bind Term type noted above, indexing can be applied to either TableColunm1, TableColumn2, or both.

A Cross Term can reduce to a Bind Term, at which time an index can possibly be applied to a column. As an example of how a Cross Term can reduce to a Bind Term, consider the following example:

T1.TableColumn1×
T2.TableColumn2=T3.TableColumn3;
In this example, T1.TableColumn1 is joined with T2.TableColumn2, which forms a join result JR1.ResultColumn. The expression then becomes:
JR1.ResultColumn=T3.TableColumn3,
which is a Bind Term. Indexing can thus be applied to Result-Column or TableColumn3, or both.

In addition to these four operator types, another type or category to which a predicate expression may be assigned is the Miscellaneous Term type. Any predicate expression that cannot be associated with one of the Explicit Term, Range Term, Bind Term, and Cross Term types is associated with the Miscellaneous Term type.

If a predicate expression is assigned to the Miscellaneous Term type, indexing and statistics are not used for the query plan that invokes the predicate expression. In conventional database systems, predicate expressions containing user-defined routines such as UDMs and UDFs are assigned to the Miscellaneous Term type, which means that performance-enhancing features cannot be employed.

With the prevalence of user-defined routines, the inability to use performance-enhancing features can substantially adversely affect database performance. As an example of the increased prevalence of user-defined routines, new standards have been proposed to take advantage of the flexible features provided by UDTs. One such standard provides a geospatial package that describes a suite of UDTs and UDMs that are used for representing geometric entities such as circles, rectangles, polygons, lines, points, and so forth. In the geospatial package, many of the UDMs perform mathematical operations. Example UDMs include OVERLAP (to determine whether one geometric structure overlaps another geometric structure), INTERSECT, TOUCHES, CROSSES, CONTAINS, WITHIN, and so forth. In a database system having tables that store geometric data according to the geospatial UDT, invocation of UDMs in database queries to process the data stored in such tables would be a frequent occurrence. Therefore, it is desirable for the optimizer to be able to take advantage of the use of statistics and indexing to enhance the performance of query plans.

The geospatial UDT is one example of a UDT. Many other types of UDTs can be defined by a user. Also, as mentioned above, use of a UDT is not necessary for a user to define routines for performing predefined tasks. For example, UDFs do not have to operate on UDTs, as they can also operate on predefined data types such as integers, real numbers, character strings, and so forth.

To enable the database software to use the performance-enhancement features such as indexing and statistics, a mechanism according to some embodiments is provided to indicate that a particular user-defined routine is to be represented in the database system as an operator-based parse tree so that the optimizer of the database system is able to categorize a predicate expression invoking the user-defined routine according to one of the Explicit Term, Range Term, Bind Term, and Cross Term types.

The mechanism according to some embodiments is described in the context of the example database system 14 shown in FIG. 2. The database system 14 includes a parsing engine 16, which has a parser 18 and a scheduler 20. The parser 18 receives database queries (such as those submitted by the client system 10), parses the received query, and generates executable steps. The parser 18 includes an optimizer 22 that generates query plans, selecting the most efficient from among the plural query plans. The scheduler 20 sends the executable steps generated by the parser 18 to multiple access modules 24 in the database system.

Each access module 24 performs the following tasks: inserts, deletes, or modifies contents of tables; creates, modifies, or deletes definitions of tables; retrieves information from definitions and tables; and locks databases and tables. In one example, each access module 24 is based on an access module processor (AMP) used in some TERADATA® database systems from NCR Corporation. Each access module 24 manages access of data in respective storage modules 26. The plural storage modules 26 make up a storage 28 of the database system 14. The presence of multiple access modules 24 and corresponding storage modules 26 define a parallel database system. In alternative embodiments, instead of database systems having multiple access modules, a database system with only one access module can be employed.

As noted above, to create a UDM, SQL-99 provides a CREATE METHOD DDL directive. To create UDFs, SQL-99 provides a CREATE FUNCTION DDL directive. In one embodiment, to indicate that the created method or function is to be represented as an operator-based parse tree, a special indicator can be defined for insertion into the CREATE METHOD or CREATE FUNCTION statement. As one example, this indicator is a BIND_TO_BINOP indicator. The following are examples of usage:

CREATE METHOD MyMethod1 . . . [fields] . . . BIND_TO_BINOP;
    CREATE FUNCTION MyFunction1 . . . [fields] . . . BIND_TO_BINOP;

With the statements above, the presence of the BIND_TO_BINOP indicator causes any predicate expression invoking MyMethod1 or MyFunction1 to be represented as an operator-based parse tree in the database system. As a result, when the optimizer 22 generates the query plan for a query containing a predicate expression that invokes either the MyMethod1 method or the MyFunction1 function, it will use the operator-based parse tree to determine which operator type the predicate expression invoking the MyMethod1 method or MyFunction function is to be categorized in. Based on the operator type, the optimizer 22 can determine whether use of indexing or statistics would be useful in a query plan.

In an alternative embodiment, instead of adding the BIND_TO_BINOP indicator to the CREATE METHOD or CREATE FUNCTION statement, a new DDL statement may be used, such as the following:

CREATE BIND METHOD MethodName TO BINARY_OP;

This statement indicates that the method MethodName is to be represented as an operator-based parse tree. A similar statement can be used for functions, such as the following:

CREATE BIND FUNCTION FunctionName TO BINARY_OP;

Whenever a DDL statement is issued, such as to create a new table, alter a table (such as adding or deleting columns from a table), create a new method, create a new function, and so forth, data dictionaries 30 (FIG. 1) are updated. The database software accesses data dictionaries whenever a data manipulation language (DML) statement is issued to determine characteristics of the tables and columns In the case of UDMs and UDFs, the data dictionaries 30 contain information pertaining to whether a UDM or UDF is to be represented as an operator-based parse tree that is a candidate for performance-enhancement features such as indexing and statistics.

Figure 3:
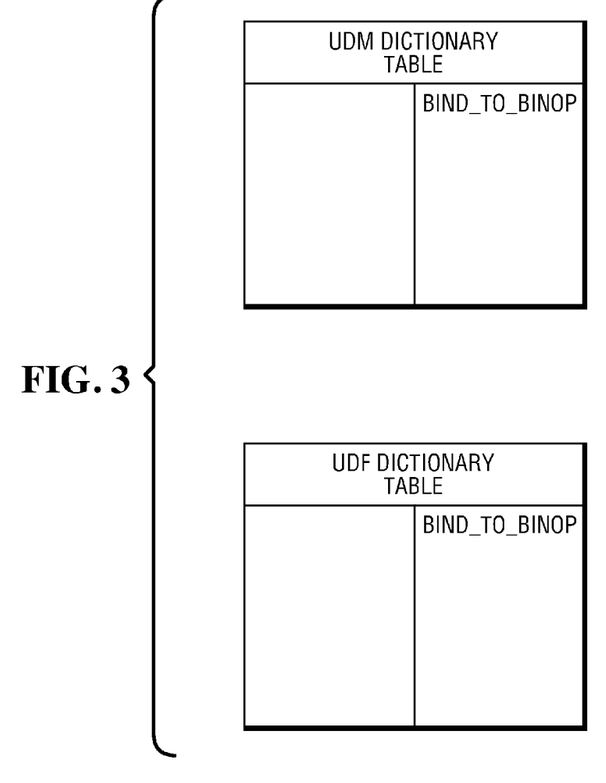
FIG. 3 illustrates data dictionary tables for user-defined methods (UDMs) and user-defined functions (UDFs).

According to one embodiment, the data dictionaries 30 include dictionary tables, such as those shown in FIG. 3. FIG. 3 includes a UDM dictionary table and a UDF dictionary table. The UDM dictionary table includes multiple rows that correspond to multiple methods that are created in the database system 14. The multiple columns of the UDM dictionary table define the attributes of each UDM. One of those columns is the BIND_TO_BINOP column to indicate whether the corresponding UDM is to be represented as an operator-based parse tree. The UDF dictionary table similarly contains attributes for corresponding UDFs, including a BIND_TO_BINOP attribute.

Figure 4A:
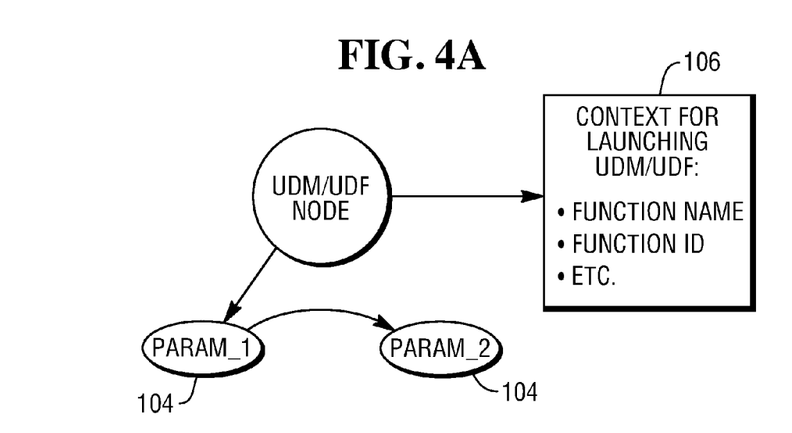
FIG. 4A illustrates a function-based parse tree.

If the BIND_TO_BINOP attribute in the UDM or UDF data dictionary table is not set, then the corresponding UDM or UDF is represented as a function-based parse tree, as shown in FIG. 4A. A function-based parse tree includes a function node, and one or more parameters 104 associated with the UDF or UDM. Also associated with the user-defined routine is a function context block 106 that defines the user-defined routine, including the name of the routine, the identifier of the routine, and other information relating to the routine. When the parser 18 (FIG. 1) encounters a function-based parse tree, it categorizes the associated predicate expression as a Miscellaneous Term.

Figure 4B:
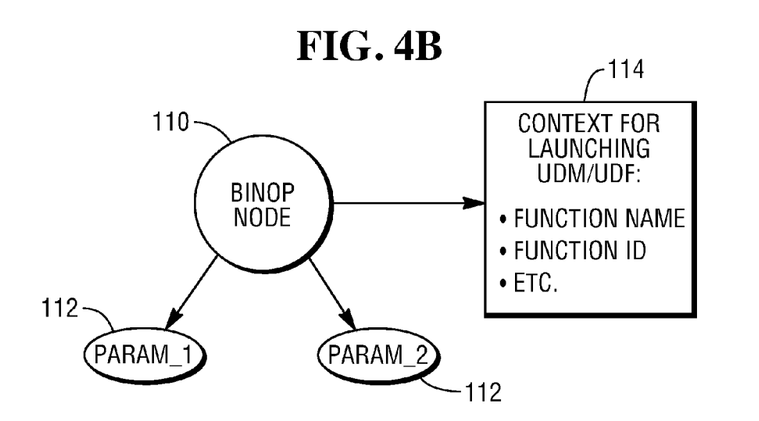
FIG. 4B illustrates an operator-based parse tree in accordance with one embodiment.

If the BIND_TO_BINOP attribute in the UDM or UDF data dictionary table is set, then the corresponding user-defined routine is represented as a binary operator tree, which is a new type of operator-based parse tree, shown in FIG. 4B. The binary operator parse tree includes a binary operator node 110 and one or more associated parameters 112. Also associated with the binary operator parse tree is a user-defined routine context block 114. When the optimizer 22 encounters a binary operator parse tree, the optimizer 18 will attempt to categorize the corresponding predicate expression to one of the category types discussed above. More generally, the BIND_TO_BINOP attribute is a kind of indicator having one of plural values to indicate whether the associated user-defined routine is to be represented as an operator-based parse tree or function-based parse tree.

Figure 5:
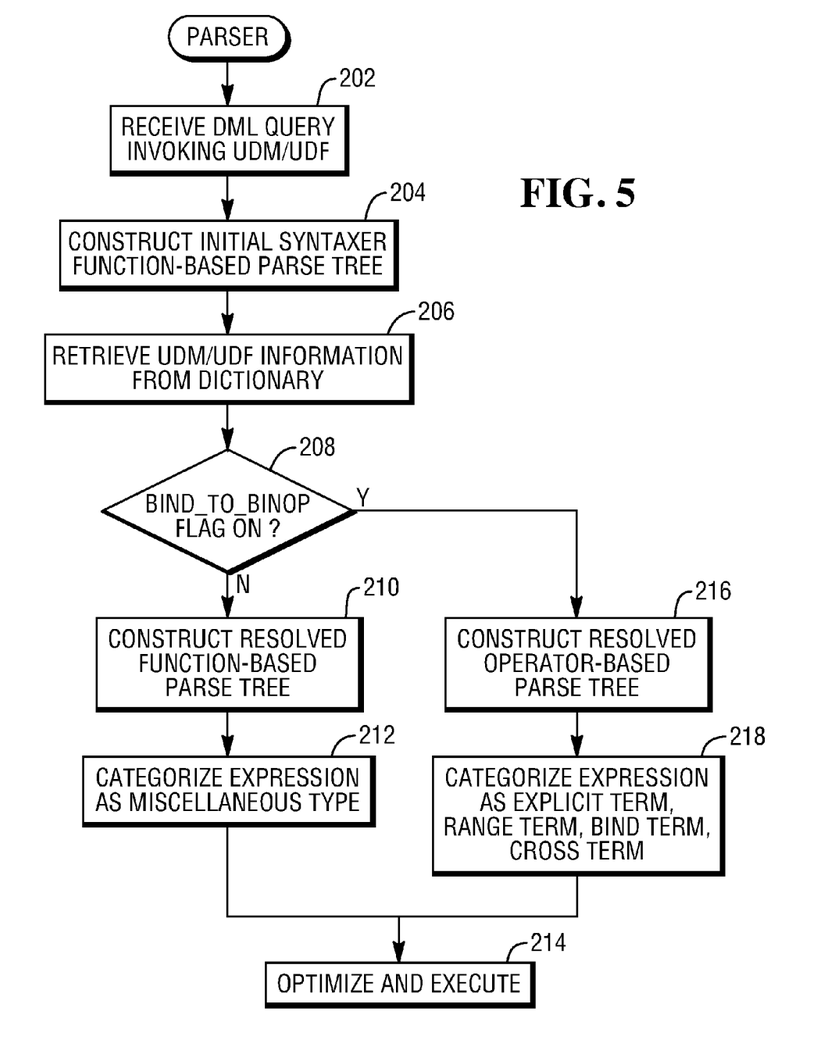
FIG. 5 is a flow diagram of a process according to one embodiment.

FIG. 5 illustrates a flow according to some embodiments for processing a DML database query that contains a predicate expression invoking a user-defined routine. The parser 18 receives (at 202) a DML query that invokes a UDM or UDF (a "user-defined routine"). For example, a DML query can be as follows.

SELECT MyCircle
    FROM MyCircleTable
    WHERE MyCircle.OVERLAPS (NEW CIRCLE(1,1, 9));

In the example, MyCircle is a column according to a UDT (such as a geospatial UDT). The table containing the MyCircle column is MyCircleTable. The query also includes a predicate clause (the WHERE clause). The rows of the MyCircleTable contain information pertaining to different circles (including information in the MyCircle column). The WHERE clause performs a predicate operation to identify circles that overlap a circle having a center point coordinate (1, 1) and having a radius of 9 (NEW CIRCLE(1, 1, 9)). The parameter CIRCLE is also a UDT, and can be created according to the following DDL directive: CREATE TYPE CIRCLE AS (X INT, Y INT, R INT), where X represents the coordinate on an X axis, Y represents a coordinate on an Y axis, and R represents the radius of the circle. Thus, the instantiation NEW CIRCLE (1, 1, 9) sets X=1, Y=1, and R=9, which defines a circle centered at (X, Y,)=(1, 1) having a radius R=9.

For the predicate expression that invokes the user-defined routine, the parser 18 constructs (at 204) an initial syntaxer function-based parse tree to represent the relationship in the predicate expression.

For the example query above, the syntaxer function-based parse tree constructed by the parser 18 represents the relationship MyCircle.OVERLAPS (NEW CIRCLE (1, 1, 9)).

In the flow of FIG. 5, resolver logic in the parser 18 queries the data dictionary table (either the UDM dictionary table or the UDF dictionary table) for information pertaining to the MyCircleTable and the MyCircle column. The resolver logic retrieves (at 206) the relevant information from the dictionary table, including the BIND_TO_BINOP attribute.

The parser 18 next determines (at 208) whether the BIND_TO_BINOP attribute is set or not for the OVERLAPS method. If not, the parser 18 constructs (at 210) a resolved function-based parse tree. The parser 18 categorizes (at 212) the predicate expression as a Miscellaneous Term. The query is then optimized and executed (at 214). Since the predicate expression is categorized as a Miscellaneous Term, performance-enhancement features such as indexing and statistics are not employed by the optimizer 22. On the other hand, if the parser 18 determines (at 208) that the BIND_TO_BINOP attribute is set for the OVERLAPS method, the parser 18 constructs (at 216) a resolved binary operator parse tree for the expression MyCircle.OVERLAPS (NEW CIRCLE (1, 1, 9)). In the binary operator parse tree format, the expression is converted to the following format: MyCircle BINOP NEW CIRCLE (1, 1, 9). Note that this format has a binary operator node (similar to that shown in FIG. 4B), a left expression MyCircle and a right expression NEW CIRCLE (1, 1, 9). This format is categorized (at 218) as the Explicit Term type. For other types of predicate expressions that invoke user-defined routines, the parser 18 can categorize the expressions as any one of a Range Term, a Bind Term, a Cross Term, or a Miscellaneous Term. The query is then optimized and executed (at 214). Depending on the operator type of the predicate expression, statistics or indexing may be employed by the optimizer 18 in generating a query plan.

A mechanism has been defined to enable predicate expressions invoking user-defined routines to be categorized according to one of plural relational operator types. In some implementations, a predicate expression invoking a user-defined routine is represented as an operator-based parse tree instead of a function-based parse tree so that the optimizer is able to categorize the predicate expression as one of the operator-based types. This enables the optimizer to use performance-enhancement features, such as indexing and statistics, in generating the corresponding query plan.

Instructions of the various software routines or modules discussed herein (such as the parser 18 and user-defined routines) are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software modules and layers) are stored in respective storage units, which can be implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software modules or layers are loaded or transported to each device or system in one of many different ways. For example, code segments including instructions stored on floppy disks, CD or DVD media, a hard disk, or transported through a network interface card, modem, or other interface device are loaded into the device or system and executed as corresponding software modules or layers. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a database system having at least one processor, comprising:
   creating a user-defined routine in the database system;
   selectively setting an indicator to have one of plural values;
   representing a predicate expression invoking the user-defined routine with one of plural types of data structures based on the value of the indicator; and
   selecting, by an optimizer executed on at least one processor in the database system, whether or not to use indexing and statistics in a query plan for a query containing the predicate expression based on determining which of the plural types of data structures is used to represent the predicate expression invoking the user-defined routine.

2. The method of claim 1, further comprising categorizing the predicate expression as one of plural operator types in response to determining that the predicate expression is represented with a first one of the plural types of data structures.

3. The method of claim 2, wherein categorizing the predicate expression as one of plural operator types comprises categorizing the predicate expression as one of an explicit term type, a range term type, a bind term type, and a cross term type.

4. The method of claim 3, wherein representing the predicate expression with the first type data structure comprises representing the predicate expression with an operator-based parse tree.

5. The method of claim 3, further comprising categorizing the predicate expression as a miscellaneous type in response to determining that the predicate expression is represented as a second one of the plural types of data structures.

6. The method of claim 1, wherein the optimizer selects the use of at least one of indexing and statistics based on the predicate expression being represented as a first one of the plural types of data structures.

7. The method of claim 6, wherein the optimizer does not select the use of indexing and statistics based on the predicate expression being represented as a second one of the plural types of data structures.

8. The method of claim 6, further comprising categorizing the predicate expression that is represented by the first type of data structure as one of plural operator types,
   wherein the optimizer selects the use of at least one of indexing and statistics based on the categorizing.

9. The method of claim 1, further comprising representing the predicate expression with an operator-based parse tree structure if the indicator has a first value, and representing the predicate expression with a function-based parse tree structure if the indicator has a second value, the operator-based parse tree structure and function-based parse tree structure being two of the plural types of data structures.

10. The method of claim 9, further comprising receiving a statement to create the user-defined routine, wherein the statement contains the indicator and an associated value assigned to the indicator.

11. The method of claim 9, further comprising receiving a statement to set the value of the indicator for the user-defined routine.

12. The method of claim 9, further comprising storing the indicator in a data dictionary.

13. The method of claim 9, further comprising storing the indicator in a data dictionary table associated with the user-defined routine.

14. The method of claim 1, wherein selectively setting the indicator to have one of plural values is performed using a data definition language (DDL) statement.

15. The method of claim 1, further comprising outputting, by the at least one processor, a result produced by executing the query.

16. An article comprising at least one machine-readable storage medium containing instructions that when executed cause at least one processor in a database system to:
   receive a database query containing a predicate expression that invokes a user-defined routine;
   receive a statement that sets the indicator to one of a first value and a second value;
   construct a first representation of the predicate expression in response to the indicator having the first value; and
   construct a second, different representation of the predicate expression in response to the indicator having the second value.

17. The article of claim 16, wherein the instructions when executed cause the database system to retrieve a value of the indicator from a data dictionary table.

18. The article of claim 16, wherein receiving the statement comprises receiving a CREATE METHOD statement to set the indicator to one of the first and second values.

19. The article of claim 16, wherein receiving the statement comprises receiving a CREATE FUNCTION statement to set the indicator to one of the first and second values.

20. The article of claim 16, wherein constructing the first representation comprises constructing a function-based parse tree.

21. The article of claim 20, wherein constructing the second representation comprises constructing an operator-based parse tree.

22. The article of claim 16, wherein the instructions when executed cause the database system to further use at least one of indexing and statistics in generating a query plan for the database query in response to categorization of the predicate expression that is represented by the second representation.

23. The article of claim 22, wherein the instructions when executed cause the database system to not use indexing and statistics in generating the query plan in response to categorization of the predicate expression that is represented by the first representation.

24. The article of claim 16, wherein the instructions when executed cause the at least one processor to further output a result produced by execution of the database query.

25. A database system, comprising:
   a storage to store an indicator; and
   a controller including at least one processor to receive a database query containing a predicate expression that invokes a user-defined routine, and to receive a statement to set a value of the indicator,
   the controller to construct a first representation of the predicate expression in response to the indicator having a first value, and
   the controller to construct a second representation of the predicate expression in response to the indicator having a second value.

26. The database system of claim 25, the storage to store a data dictionary containing the indicator.

27. The database system of claim 26, wherein the user-defined routine comprises a user-defined method, wherein the data dictionary comprises a data dictionary table for the user-defined method.

28. The database system of claim 26, wherein the user-defined routine comprises a user-defined function, and the data dictionary comprises the data dictionary table for the user-defined function.

29. The database system of claim 25, wherein the statement comprises a data definition language (DDL) statement to assign the value of the indicator.

30. The database system of claim 29, wherein the DDL statement comprises one of a CREATE METHOD statement and a CREATE FUNCTION statement.

31. The database system of claim 25, wherein the first representation comprises an operator-based parse tree, and the second representation comprises a function-based parse tree.

32. The database system of claim 25, the controller to use at least one of indexing and statistics in response to categorization of the predicate expression that is represented by the first representation but to not use indexing and statistics in response to categorization of the predicate expression that is represented by the second representation.

33. The database system of claim 25, wherein the controller comprises a parser.

34. The database system of claim 33, wherein the parser comprises an optimizer.

35. The database system of claim 25, wherein the controller is configured to further output a result produced by execution of the database query.

* * * * *